United States Patent [19]

Rottländer

[11] 4,300,419
[45] Nov. 17, 1981

[54] HOLDER FOR ANNULAR WORKPIECES

[75] Inventor: Manfred Rottländer, Burscheid, Fed. Rep. of Germany

[73] Assignee: Goetze AG, Burscheid, Fed. Rep. of Germany

[21] Appl. No.: 93,929

[22] Filed: Nov. 13, 1979

[30] Foreign Application Priority Data

Nov. 13, 1978 [DE] Fed. Rep. of Germany ....... 2849148

[51] Int. Cl.³ ........................ B23B 25/00; B23B 33/00
[52] U.S. Cl. ........................................ 82/44; 82/40 R; 279/1 Q
[58] Field of Search ................... 82/40, 43, 44, 45; 279/1 Q

[56] References Cited

U.S. PATENT DOCUMENTS

| | | | |
|---|---|---|---|
| 1,414,190 | 4/1922 | Koehler | 82/40 |
| 1,901,942 | 3/1933 | Abramson | 82/43 |
| 1,944,255 | 1/1934 | McFall et al. | 82/44 |
| 2,436,526 | 2/1948 | Olson | 82/44 |
| 2,573,928 | 11/1951 | Peter | 82/44 |
| 2,765,175 | 10/1956 | Parker et al. | 279/1 Q |
| 2,943,729 | 7/1960 | Dalrymple | 82/44 |
| 4,114,909 | 9/1978 | Taitel et al. | 279/1 Q |
| 4,141,263 | 2/1979 | Leutgab | 82/45 |

FOREIGN PATENT DOCUMENTS

| | | |
|---|---|---|
| 571579 | 3/1933 | Fed. Rep. of Germany. |
| 2633432 | 1/1978 | Fed. Rep. of Germany. |
| 2144800 | 6/1978 | Fed. Rep. of Germany. |

*Primary Examiner*—Harrison L. Hinson
*Attorney, Agent, or Firm*—Spencer & Kaye

[57] ABSTRACT

A workpiece holder for the centered holding of annular workpieces, for working one of the circumferential faces of the workpieces, the holder including a basic element having a generally cylindrical support surface, a plurality of segments which are distributed around the circumference of the cylindrical support surface for radially clamping the workpieces individually, and an elastic support member connecting the segments to the basic element.

12 Claims, 3 Drawing Figures

HOLDER FOR ANNULAR WORKPIECES

BACKGROUND OF THE INVENTION

The present invention relates to a workpiece holder for holding annular workpieces, preferably a packet of such workpieces, in a centered manner, in particular piston rings and rings for synchronizing gears for working the inner and outer circumferential faces, the holder being of the type which includes a sleeve- or mandrel-type basic element.

German Patent No. 2,144,800 discloses a machine for automatically turning an inner groove in slotted piston rings in which the rings, which are introduced from a stack, are held under a clamping sleeve and are pressed into the clamping sleeve by a pressure ram. The rings are held axially, on the one hand by a pressure ram and, on the other hand, by an inner collar and are thus worked by means of a vertical tool spindle in the form of a double fly-cutter.

Slotted piston rings, after they have been pressed together radially, have almost identical diameters and can easily be packeted in this form and then machined. Rigid receptacles, as disclosed in German Patent No. 21 44 800, for example, can be used for packeted piston rings with almost identical diameters, but such a device cannot be used to circumferentially work packeted rings with different wall thicknesses and thus different outer and inner diameters since the rings, when they are pressed in, would warp, or their outer circumferential surfaces would not be placed against the inner circumference of the receptacles. The result is off center positioning and thus irregular machining, and this would inevitably lead to the rejection of the workpieces involved.

SUMMARY OF THE INVENTION

It is therefore an object of the present invention to cause a plurality of rings, preferably rings combined into a packet, whose dimensions lie within manufacturing tolerances but which have different radial wall thicknesses and diameters from one another, to be held in a centered position by a basic element so that, upon completion of circumferential working, the differences in wall thickness within one individual piece as well as between individual workpieces meet design requirements.

This and other objects are achieved, according to the invention, in a workpiece holder for the centered holding of annular workpieces, for working one of the circumferential faces of the workpieces, the holder including a basic element having a generally cylindrical support surface, by the provision of a plurality of segments which are distributed around the circumference of the cylindrical support surface for radially clamping the workpieces individually, and an elastic support member connecting the segments to the basic element.

Due to the fact that the basic element can have the shape of a sleeve or a mandrel, such workpiece holders can be used very easily for working the inner or outer circumferential faces of the workpieces, working here being understood to mean not only cutting or separating but also the spraying on of wear resistant coatings.

Preferably at least three segments are associated with each workpiece so that each workpiece can rest uniformly with one circumferential face against the corresponding circumferential faces of its associated segments which are supported via the elastic support. The elastic support is preferably composed of a rubber coating, but may just as well be formed of elastic elements such as springs.

Since cast rings exhibit certain differences in radial wall thickness from one piece to the other, this type of workpiece holder makes it possible to hold a plurality of such workpieces in a uniformly centered manner and thus to work them since each workpiece, depending on its particular radial wall thickness dimension, utilizes the elasticity of the rubber layer to a greater or lesser degree. This assures that almost all processed workpieces will have dimensions within the required tolerances and that therefore the rejection rate will be extremely low.

Preferably the rubber coating is vulcanized or glued to the basic element and/or to the segments. Moreover, the segments preferably have the same axial dimension, or thickness, as the workpieces to be processed so that a circumferentially distributed group of segments cooperates with only one workpiece and radial movements of one workpiece and its associated segments do not interfere with those of adjacent workpieces. Moreover, all segments have the same radial wall thickness so that the elasticity of the rubber layer need not be utilized before the workpiece are pressed in or clamped on, which would produce eccentricity when the workpieces are being held.

According to a further feature of the present invention the edges of the circumferential faces of the segments which serve to center and clamp in the workpiece are chamfered or rounded. This has the advantage that the workpieces can be handled with greater ease during mounting on the holder and breaks at the edges or in the segments as well as in the workpieces are avoided. Thus it is assured that the workpiece holder has a relatively long service life.

It is further possible to construct embodiments of the invention in which the segments are embedded, to at least part of their radial dimension, in the elastic rubber coating.

According to the invention, a supporting element for axially guiding and holding together the segments is provided on one or both sides axially next to the segment packet. Preferably the supporting elements are given an annular shape and at least one of them is provided with a circumferential recess on its end face facing the segments in radial alignment with the rubber coating. This provides the advantage that the elastic but also incompressible rubber coating can escape axially into this circumferential recess when it is under stress from the workpieces.

Furthermore, at least one of the supporting elements is provided with a conical inner or outer circumferential face during the pressing or centering process centers those workpieces which are not already centered in the packet.

DESCRIPTION OF THE PREFERRED EMBODIMENTS

Figure 1:
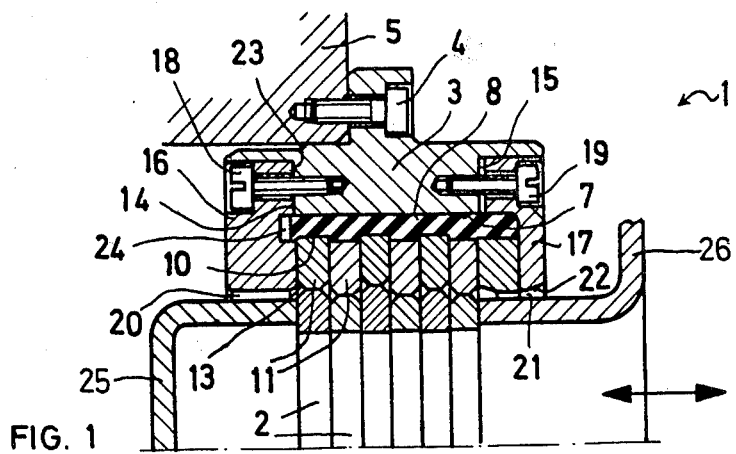
FIG. 1 is a cross-sectional, detail view of a portion of a preferred embodiment of a sleeve-type workpiece holder according to the invention.
Figure 2:
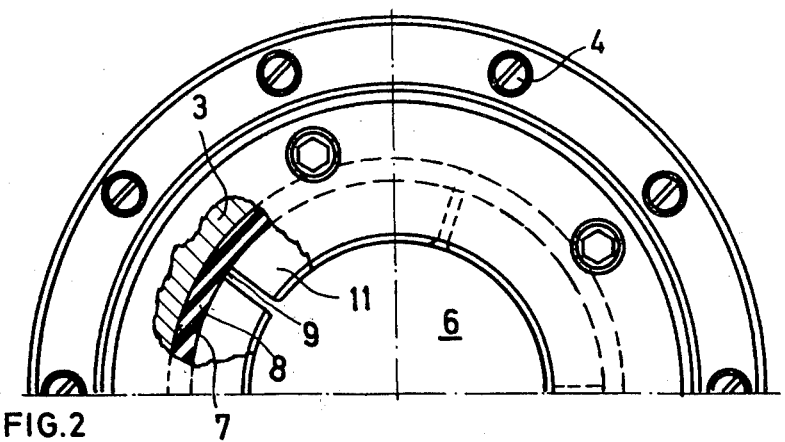
FIG. 2 is an axial cross-sectional view of the workpiece holder of FIG. 1.

FIGS. 1 and 2 show a workpiece holder 1 for the centered holding of a plurality of rings for synchronizing gears (sync rings) 2 which are clamped together in the form of a packet. The workpiece holder 1 includes a basic element 3 which is fastened by means of screws 4 to receptacle 5 in a lathe which is not shown. The basic element 3 presents a central bore 6 whose circumferential face 7 is provided with an elastic, rubber coating 8. Segments 11 are vulcanized to this rubber layer at locations 10 along its inner circumference 9 and are uniformly distributed over substantially its entire axial length. The edges 13 of the inner circumference of segments 11 are chamfered in order to facilitate the pressing of the sync rings 2 into the workpiece holder 1.

Supporting elements 16 and 17 are disposed at respective axial end faces 14 and 15 of the basic element 3 and are fastened to the basic element 3 by means of respective groups of machine screws 18 and 19 so as to axially guide and hold together the segments 11. Supporting elements 16 and 17 have respective concentric bores 20 and 21. The bore 21 of the supporting element 17 is machined to serve as a centering cone 22.

At its inner axial end face 23, the supporting element 16 is provided with a circumferential recess 24 which is disposed in the same radial plane as the rubber coating 8.

Figure 3:
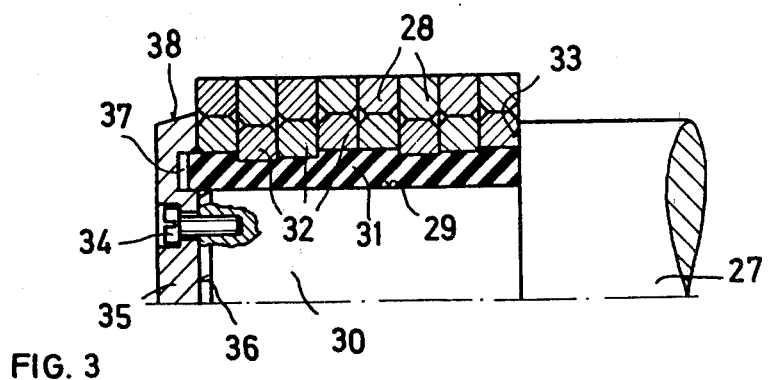
FIG. 3 is a view similar to that of FIG. 1 of a preferred embodiment of a mandrel-shaped workpiece holder according to the invention.

FIG. 3 shows a mandrel-type workpiece holder 27 arranged to accommodate a plurality of piston rings 28 having different respective radial wall thicknesses in order to permit their outer circumferential faces to be machined. The circumferential face 29 of the end 30 of the mandrel is enclosed by an elastic rubber coating 31. The segments 32, on the one hand, are supported axially against the laterally projecting circumferential face 33 of the mandrel 27 and, on the other hand, against a supporting element 35 which is fastened to the end of the mandrel 30 by means of machine screws 34. At its frontal face 36 facing the segments 32, the supporting element 35 is provided with a continuous recess 37 which is radially coextensive with the rubber coating 31. The circumferential face 38 of the supporting element 35 is made conical in order to facilitate the mounting and centering of rings 28 which might possibly lie in the packet in an eccentric manner.

The workpiece holder of FIGS. 1 and 2 is used as follows:

A packet of sync rings 2 is axially clamped between two clamping jaws 25 and 26 outside of the workpiece holder 1 and in this state are pressed into the workpiece holder axially from the right, whereby the centering cone 22 of the supporting element 17 centers those rings 2 in the pocket which might possibly be off center. Corresponding to their slightly different wall thicknesses, the individual rings 2 take advantage of the elasticity of the rubber coating 8 to a greater or lesser degree while the incompressible coating 8 can axially escape into the recess 24 of the supporting element 16. This assures that the entire range of tolerance will be uniformly distributed around the entire circumference of the rings 2. Stated in other terms, even if the radial dimension of a workpiece varies from the design value, the workpiece will be centered in the holder and will be worked symmetrically.

Once the rings are in the rest position, the workpiece holder 1 is caused to rotate and a boring tool (not shown) is guided through the concentric passage defined by jaws 25 and 26 in order to work the inner circumferential faces of the sync rings 2. The removal of material is done to bring the inner surfaces of rings 2 to the same level and the finished wall thicknesses lie within the required tolerance.

The mandrel-shaped workpiece holder of FIG. 3 is employed in essentially the same way as that explained above except that the rings 28 rest on the segments 32 not via outer circumferential faces but via their inner ones and utilize the elasticity of the rubber coating 31 to a greater or lesser degree depending on their different wall thicknesses, coating 31 being able to escape axially into recess 37. As soon as the rings 28 are in rest position, the workpiece holder 27 is caused to rotate and the outer circumferential face of the rings is worked by a rotary chisel (not shown).

It will be understood that the above description of the present invention is susceptible to various modifications, changes and adaptations, and the same are intended to be comprehended within the meaning and range of equivalents of the appended claims.

What is claimed is:

1. In a workpiece holder for clamping annular workpieces in a centered manner to permit working of one of the circumferential faces of the workpieces, which holder includes a basic element having a generally cylindrical support surface, and means for axially clamping the workpieces together, the improvement comprising: a plurality of segments arranged in groups, with the segments of each group distributed around the circumference of said cylindrical support surface in the form of a ring for radially clamping a respective workpiece and the groups of segments being disposed adjacent one another along the axis of said support surface, with the axial dimension of each group of segments being no greater than that of the respective workpiece which it is to clamp; and elastic support member connecting said segments to said basic element for permitting workpieces having respectively different radial wall thicknesses to be held by said segments in a uniformly centered manner; and two supporting elements mounted at said basic element and disposed at respective opposite sides of said plurality of segments for supporting said segments in the direction of the axis of said support surface, each said supporting element presenting an axial end face facing said segments, and one said supporting element having a circumferential groove formed in said end face of that said supporting element in the radial area of said elastic support member.

2. Apparatus as defined in claim 1 wherein said elastic support member is a rubber coating.

3. Apparatus as defined in claim 2 wherein said rubber coating is vulcanized to one of said basic element and said segments.

4. Apparatus as defined in claim 1 wherein each said group of segments has the same axial dimension as a respective workpiece which it is to clamp.

5. Apparatus as defined in claim 1 wherein all of said segments have the same radial wall thickness.

6. Apparatus as defined in claim 1 wherein one circumferential face of each said segment serves to bear against a workpiece and is formed with chamfered edges.

7. Apparatus as defined in claim 1 wherein a part of each said segment is embedded in said elastic support member.

8. Apparatus as defined in claim 1 wherein said segments are arranged in a packet.

9. Apparatus as defined in claim 8 wherein said supporting elements have an annular shape and are connected with said basic element in the region of said axial end faces.

10. Apparatus as defined in claim 9 wherein at least one circumferential surface of at least one said supporting element has a conical form.

11. Apparatus as defined in claim 1 wherein said axially clamping means are constructed for holding the annular workpieces in a packet.

12. Apparatus as defined in claim 10 wherein the workpieces are piston rings or rings for synchronizing gears.

* * * * *